United States Patent [19]

Rohrmann et al.

[11] Patent Number: 4,537,835

[45] Date of Patent: Aug. 27, 1985

[54] OXIDATION OF HYDROGEN HALIDES TO ELEMENTAL HALOGENS

[75] Inventors: Charles A. Rohrmann, Kennewick; Harold T. Fullam, Richland, both of Wash.

[73] Assignee: Battelle Memorial Institute, Richland, Wash.

[21] Appl. No.: 911,097

[22] Filed: May 31, 1978

Related U.S. Application Data

[63] Continuation-in-part of Ser. No. 770,282, Feb. 18, 1977, abandoned.

[51] Int. Cl.$^3$ .......................... C01B 7/00; C01B 7/07
[52] U.S. Cl. ................... 423/502; 423/210.5; 423/488; 423/503; 423/507; 423/DIG. 12; 502/312
[58] Field of Search ............... 423/210.5, 502, 507, 423/503, DIG. 12, 488; 252/440, 439

[56] References Cited

U.S. PATENT DOCUMENTS

| | | | |
|---|---|---|---|
| 2,381,908 | 8/1945 | Hurt | 252/440 |
| 3,131,028 | 4/1964 | Stow | 423/502 |
| 3,552,921 | 1/1971 | Blytas | 423/210.5 |
| 3,917,797 | 11/1975 | Reed et al. | 423/210.5 |

FOREIGN PATENT DOCUMENTS 1240830  5/1967  Fed. Rep. of Germany ...... 423/502

Primary Examiner—Brian E. Hearn
Attorney, Agent, or Firm—Klarquist, Sparkman, Campbell, Leigh & Whinston

[57] ABSTRACT

A process for oxidizing hydrogen halides having substantially no sulfur impurities by means of a catalytically active molten salt is disclosed. A mixture of the subject hydrogen halide and an oxygen bearing gas is contacted with a molten salt containing an oxidizing catalyst and alkali metal normal sulfates and pyrosulfates to produce an effluent gas stream rich in the elemental halogen and substantially free of sulfur oxide gases.

3 Claims, 2 Drawing Figures

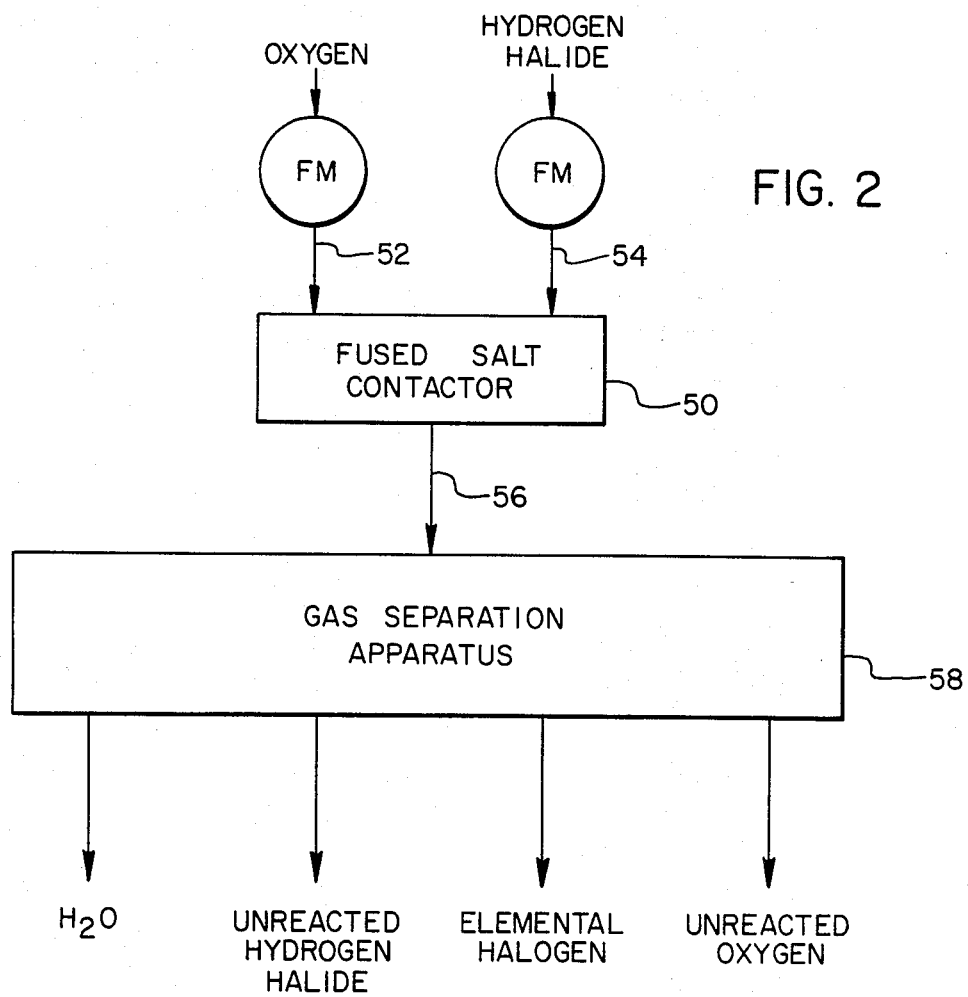

OXIDATION OF HYDROGEN HALIDES TO ELEMENTAL HALOGENS

CROSS REFERENCE TO RELATED APPLICATION

This is a continuation-in-part application of United States patent application Ser. No. 770,282, filed Feb. 18, 1977, entitled "Oxidation of Hydrogen Halides to Elemental Halogens.", now abandoned.

BACKGROUND OF THE INVENTION

The present invention relates to the regeneration of elemental halogens from hydrogen halides and/or hydrohalic acids and more specifically to the use of a molten salt to catalytically oxidize hydrogen chloride to produce chlorine.

In the production of organic chlorides for use in plastics and other products, large amounts of hydrochloric acid are frequently produced as a by-product or waste. This excess hydrochloric acid is traditionally either utilized productively as is, if possible, or neutralized with limestone and discharged to the environment as an aqueous waste.

Due to increasing restrictions on the discharge of pollutants and the rising cost of chlorine it has become attractive to provide a method for regenerating chlorine from the by-product hydrochloric acid. Because the by-product hydrogen chloride from organic chlorinations contains only a few parts per million of sulfur impurities, it is potentially excellent feedstock for the efficient production of substantially sulfur-free elemental chlorine in a minimum number of steps. A number of previous attempts have been made to regenerate chlorine from hydrochloric acid. These methods have generally met with engineering and economic problems which have prevented their implementation on a large scale.

It is presently known that hydrogen chloride may be oxidized with sulfur trioxide to produce a mixture of chlorine and sulfur dioxide. This process requires a series of at least three separate process steps to obtain the mixture from which the chlorine must be subsequently separated.

A process taught by the West German patent No. 1,240,830 (Nonnenmacher), suffers from similar drawbacks. Hydrogen chloride is contacted with $V_2O_5$, $K_2S_2O_7$, and $NaHSO_4.H_2O$ which are supported on a finely divided silica gel. Due to this choice of salts and to the behavior of such catalysts when supported on finely divided carriers considerable amounts of the $V_2O_5$ and sulfates decompose during the contacting. Concomitantly, substantial vanadium and sulfur oxide impurities are present in the product gas. To operate a process under these conditions, the catalyst material must be continuously replenished; and efforts are required to separate the added impurities in order to obtain a substantially pure chlorine product.

Another prior method is the oxidation of hydrochloric acid with sulfur dioxide and oxygen in the presence of a bed of metal oxide catalysts to produce sulfuric acid and chlorine. The solid supported catalysts used in such systems are difficult to prepare and tend to deactivate or degrade rapidly.

Oxygen has been used to oxidize hydrogen chloride in the presence of an oxide of nitrogen catalyst and an excess of sulfuric acid having a concentration of at least 65 percent. This process is complicated and expensive because it requires numerous process steps.

Hydrochloric acid has also been oxidized with oxygen in molten inorganic chlorides and an olefin chlorine acceptor such as ethylene. Such systems must accommodate complex chemical reactions which produce a variety of different reaction products. Also, because inorganic chlorides tend to volatilize in the reaction zone, the catalyst is driven off and separation of chlorine from the reactor effluent is different. Furthermore, operation with chloride salts is corrosive to process equipment.

In addition, hydrochloric acid has been regenerated by means of electrolytic processes which are expensive and which require substantial electrical energy consumption.

SUMMARY OF THE INVENTION

The present invention provides a simple method of regenerating halogens from hydrogen halides contained in a feedstock that is substantially free of sulfur impurities. The method of the present invention is especially well suited for the regeneration of chlorine, can be conducted in relatively simple apparatus and can economically be used to process large volumes of hydrogen halides. Hydrogen halide gas produced from a waste or by-product hydrohalic acid that contains substantially no sulfur compounds is mixed with oxygen or air. The resulting mixture, which also contains substantially no sulfur compounds, is contacted with a catalytically active molten salt in a suitable contactor which contains only liquids and gasses.

The salt is comprised chiefly of alkali metal pyrosulfates and normal sulfates with a lesser amount of vanadium pentoxide which serves as an oxidation catalyst. Because it is of this specific composition and is not supported by a finely divided, inert carrier, the salt mixture contributes substantially no sulfur impurities to gasses inside the contactor. The gaseous effluent stream which leaves the contactor contains the subject halogen, steam and any unreacted hydrogen halide and oxygen or oxygen depleted air, but substantially no gasesou vanadium or sulfur compounds. The halogen is separated from the mixture of effluent gasses; and thereafter the unreacted oxygen and hydrogen halide may be continuously recycled to the contactor. Because the effluent contains substantially no sulfur compounds, no energy need be consumed in separating and disposing of such impurities.

It is an object of the present invention to provide a method for economically regenerating elemental halogens from waste or by-product hydrohalic acids that contain substantially no sulfur compounds and thereby to avoid polluting the environment and to provide an inexpensive source of halogens for industrial use.

Another object is to provide such a method whereby substantially no sulfur compounds are added to the gasses passing through the process apparatus so that a feed stock containing a halogen as a hydrogen halide and substantially no sulfur compounds can be converted into an effluent gas which contains the halogen as an elemental gas and substantially no sulfur compounds.

An additional objective of the invention is to realize a significant degree of energy conservation by providing a nonelectrical method of halogen production.

It is a further objective of this invention to provide a process requirring a minimum of pretreatments such as extensive water removal from the feed streams.

It is still a further object of this invention to provide a method of regenerating halogens from hydrohalic acids which requires a minimum of equipment and supervision.

Still another object of this invention is to provide a method of oxidizing hydrogen halides with an oxygen bearing gas in the presence of liquid alkali metal sulfate containing an oxygen compound of catalytically active vanadium.

These and other objects and advantages of this invention will become apparent upon reading the following specification.

BRIEF DESCRIPTION OF THE DRAWINGS

In the drawings
FIG. 2 is a schematic flow diagram showing the general process of the present invention.

DESCRIPTION OF THE PREFERRED EMBODIMENT

Figure 1:
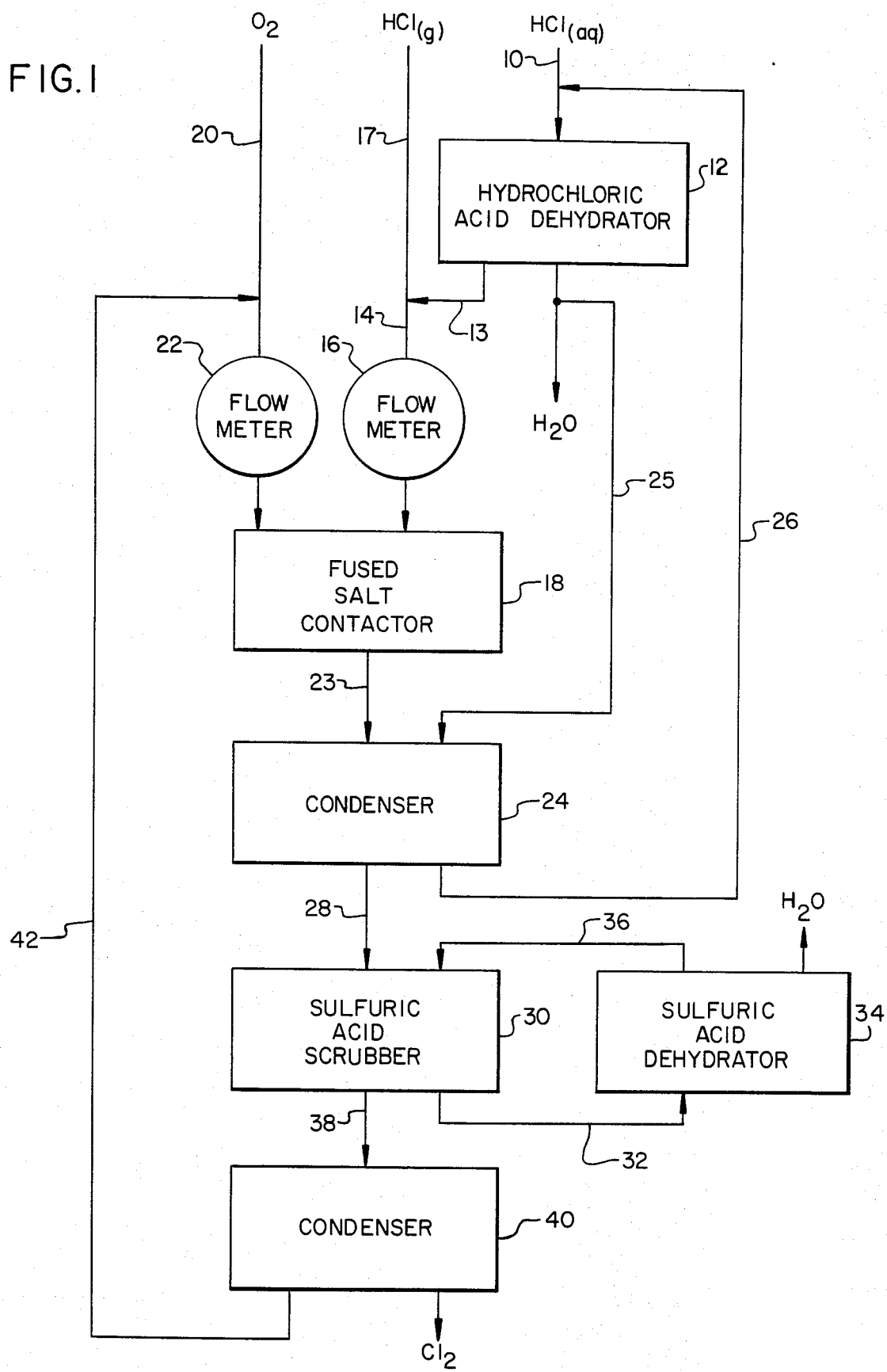
FIG. 1 is a schematic flow diagram showing the process of the present invention including specific gas separation steps for use in the separation of chlorine gas.

According to the preferred embodiment of the present invention, waste or by-product hydrochloric acid, which contains substantially no sulfur impurities, is passed via a line 10 into a hydrochloric acid dehydrator 12. In the dehydrator 12, the hydrochloric acid is concentrated and converted to a gas mixture which contains hydrogen chloride and may contain small amounts of water vapor, but no more than a few parts per million of sulfur compounds. This mixture is directed via a line 13 into a line 14 containing a flow meter 16. If waste or by-product hydrogen chloride is substantially free of water, it can, of course, be fed directly into the line 14, via a line 17 without passing through the dehydrator 12. Hydrogen chloride passes through the line 14 into a fused salt contactor 18 along with oxygen which moves to the contactor via line 20 and flow meter 22. Inside the contactor, which contains only liquids and gasses, the hydrogen chloride and a stream of oxygen are contacted with a molten salt mixture which catalyzes the oxidation of the hydrogen chloride according to the reaction:

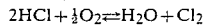

$$2HCl + \tfrac{1}{2}O_2 \rightleftharpoons H_2O + Cl_2 \qquad (1)$$

To inhibit the decomposition of salt mixture components, the salt mixture is not supported on a finely divided carrier material. The effluent gas leaving the contactor 18 via a line 23 contains substantial amounts of water vapor and chlorine along with some residual hydrogen chloride and oxygen, but substantially no sulfur compounds. The hydrogen chloride and a majority of the water vapor in the effluent gas stream may be removed by means of a condenser 24. In the condenser, the effluent gas stream is cooled until the water vapor condenses and dissolves the hydrogen chloride to form hydrochloric acid. If the amount of water obtained from the effluent gas is insufficient to dissolve all of the hydrogen chloride some make-up water should be added to the condensed water vapor. Such make-up water may be obtained from the dehydrator 12 via a line 25. If the dehydrator 12 is less than perfectly efficient, the effluent it produces will actually be a weak hydrochloric acid. By using the dehydrator 12 as a source of make-up water for the condenser 24, at least a portion of the dilute acid is recycled. The concentrated hydrochloric acid produced in the condenser 24 may be recycled by returning it via a line 26 to the line 10 upstream of the dehydrator 12.

The mixture leaving the condensor 24 through a line 28 consists of oxygen, chlorine and a small residual amount of water vapor. These gases are scrubbed in a sulfuric acid scrubber 30 to absorb the water vapor. As sulfuric acid passes through the scrubber 30 it becomes diluted with water. The diluted acid may be continuously regenerated by passing it via a line 32 to a suitable sulfuric acid dehydrator 34 which includes a heating means for vaporizing the water to concentrate the sulfuric acid. The reconcentrated acid is subsequently returned to the acid scrubber 30 via a line 36. The gas mixture which leaves sulfuric acid scrubber 30 via a line 38 contains oxygen and chlorine and is suitable for many industrial uses, such as the bleaching of paper pulp, without further treatment. If a supply of liquified chlorine is desired, chlorine may be separated from oxygen in a condenser 40 which cools the gas to liquify the chlorine. A gas stream leaving the condenser 40 consists substantially of oxygen with a residual fraction of uncondensed chlorine gas. This stream may be returned via a line 42 to the oxygen feed line 20 at a point upstream of the flow meter 22 so that oxygen from the condenser 40 can be used in a subsequent oxidization of hydrogen chloride. Residual chlorine in the oxygen return stream will thus also be recycled instead of lost.

Although oxygen is the preferred oxidizing gas of the present invention, other oxygen-bearing gases could be used. Air is suitable, but if it is used the gas mixture leaving the condenser 40 contains substantially less oxygen than nitrogen. It is not advantageous to recycle this mixture to the salt scrubber via the line 42, because nitrogen would rapidly build up to intolerable levels. Disposal of the mixture would reduce the overall efficiency of the system because a fraction of the regenerated chlorine would be lost. The nitrogen bearing gas mixture can itself be a useful product if conditions in the condenser 40 are adjusted so that gases leaving the condenser contain a significant amount of chlorine. Such a chlorine containing mixture can be used in a chlorination operation or directly for the production of chlorine products such as inorganic chlorides, hypochlorides or certain other organic chlorides.

For maximum efficiency of the entire chlorine recovery system it is necessary that oxygen and hydrogen chloride be fed to the salt contactor 18 in a proper ratio and that a minimum of water enter the salt contactor via the line 14. The stoichiometric ratio of hydrogen chloride to oxygen, according to equation (1), is four moles of hydrogen chloride to one mole of oxygen gas. Under most actual operating conditions it is preferable to have an excess of oxygen. Assuming that the feed stock gases are substantially pure, a ratio of between 3.3 and 3.7 moles of hydrogen chloride per each mole of oxygen is preferred with a ratio of 3.5 being the most favored. In some applications it may be desirable to operate with a deficiency of oxygen in the feedstock so that the effluent gases contain very little oxygen. Such operation would be advantageous because chlorine could be more easily separated from the effluent gases since the effluent gases would contain less oxygen which is more difficult to remove than is hydrogen chloride. It would be disadvantageous because efficiency of the hydrogen chloride oxidization would be reduced and additional hydrogen chloride recycle capacity would be required. Also, some experimentation may be necessary to determine the most preferred ratio in any given application of the present invention because the presence of impurities in the feedstock gases will have an effect on the reaction.

It is important that the water content of the feed gases be low because the amount of water in the salt contactor effects the equilibrium of the oxidation reaction. Referring to equation (1), excess water will drive the reaction to the left and thus impede the formation of chlorine. Small amounts of water do not substantially effect the formation of chlorine, but if sufficiently large quantities of water are present, chlorine formation could be severly reduced. To obtain the most economical operation, the expense of feedstock dehydration can be weighed against the amount and value of chlorine regenerated to determine the preferred water content for the feedstock streams.

A salt composition suitable for use according to the process of the present invention includes alkali metal normal sulfates, alkali metal pyrosulfates and a dissolved oxidizing catalyst. The oxidizing catalyst is preferably an oxygen compound of vanadium such as $V_2O_5$. When $V_2O_5$ is included in the salt mixture, it preferably comprises between 2 and 25 wt. percent of the salt mixture so that the entire amount will dissolve in the melt. More preferably the mixture includes between 10 and 15 wt. percent $V_2O_5$. Other soluble metal compounds may be used to catalyze the oxidation of hydrogen chloride according to the process of the present invention. These include soluble sulfates, oxides or chlorides of copper, iron, chromium or manganese and, to a lesser extent, of lead, nickel, cobalt or uranium.

A variety of different alkali metal sulfates and pyrosulfates may be chosen to make up the bulk of the mixture. Normal sulfates and pyrosulfates of potassium and sodium are preferred due to their abundance and favorable characteristics. A mixture containing 5 to 25 wt. percent potassium sulfate and 50 to 90 wt. percent potassium pyrosulfate is satisfactory. The preferred range of these sulfates is 10 to 20 wt. percent potassium sulfate and 65 to 70 wt. percent potassium pyrosulfate. Small amounts of any soluble sulfates and pyrosulfates can be added to such a mixture of potassium compounds without greatly reducing the effectiveness. In addition, the inclusion of small amounts of lithium sulfate, sodium sulfate or sulfuric acid has been found to have desirable effects on the freezing temperature, corrosivity, $SO_3$ vapor pressure, viscosity, operating temperature range, and catalyst stability of the salt mixture. The combined amount of these named substances in the salt mixture should not substantially exceed 10 wt. percent. Additions beyond this amount are found to be either undesirable or unfeasible.

When the preferred mixture of potassium compounds is used, the salt bath is operable to oxidize hydrogen chloride in a temperature range of between 275° C. and 475° C.; the preferred range being between 325° C. and 425° C. If the gaseous mixture is maintained in contact with the salt bath in this temperature range, for at least 0.25 seconds, and preferably for between 0.5 and 5.0 seconds, a substantial amount of hydrogen chloride will be oxidized to chlorine according to the reaction of equation (1).

Because the molten salt mixture contains substantial amounts of normal sulfate, and because the mixture is not dispersed on a finely divided inert support material, the salt contactor can be operated at the above temperatures without converting the salt mixture into gaseous sulfur and vanadium compounds. It is thus unnecessary to continuously replenish the salt mixture; and energy is conserved because there is substantially no sulfur dioxide to be separated from the effluent product gas mixture.

Sodium sulfate and sodium pyrosulfate can be substituted for all or part of the potassium sulfate and potassium pyrosulfate in the above described salt mixture. The resulting mixture will perform suitably, but will be somewhat less thermally stable and less catalytically active than the preferred mixture of potassium salts. Also, the partial pressure of $SO_3$ tends to be higher at a given temperature when sodium salts are used.

Assuming, conservatively, that sixty percent conversion of hydrogen chloride is achieved with a feed ratio of 3.5 moles of hydrogen chloride per mole of oxygen, the effluent gas leaving the salt contactor of the present invention would contain by volume about:

26.5% $Cl_2$
26.5% $H_2O$
35.0% HCl
12.0% $O_2$;

After removal of unconverted hydrogen chloride and water in the condenser 24 and acid scurbber 30 the remaining gas stream would have a composition by volume of about;

69.0% $Cl_2$
31.0% $O_2$

If it is desired that the final gas stream have a lower percentage of oxygen it is possible to increase the ratio of hydrogen chloride to oxygen entering the salt contactor thereby producing additional hydrogen chloride but less oxygen in the effluent gas which leaves the contactor. Because hydrogen chloride is easily removed from the effluent gas stream, the ratio of chlorine to oxygen leaving the sulfuric acid scrubber can be increased without substantially increasing the size of the condenser 24.

If, in the same system, air were used as the oxidizing gas, the following would be an estimate of the composition by volume of the effluent gas leaving the salt contactor:

13.2% $Cl_2$
13.2% $H_2O$
17.6% HCl
6.0% $O_2$
50.0% $N_2$

Again, these figures are based on a conservative sixty percent conversion of HCl. After treatment in condenser 24 and the acid scrubber 30 to remove steam and unreacted hydrogen chloride, the effluent gas would, by volume, contain about:

19.0% $Cl_2$
8.6% $O_2$
72.4% $N_2$

EXAMPLE

A series of experiments was conducted to determine whether efficient conversion of hydrogen chloride to chlorine could be accomplished according to the process of the present invention. In these experiments a Vycor vessel having a 1.4 inch inside diameter was used to contain the molten catalyst mixture to a depth of approximately nine inches. The catalyst mixture consisted of eighty wt. percent $K_2S_2O_7$, ten wt. percent $K_2SO_4$ and ten wt. percent of $V_2O_5$. Metered streams of hydrogen chloride and air were combined and then dispersed into the molten catalyst mixture by means of a Pyrex frit. The effluent gas leaving the vessel was scrubbed with a KI solution to remove the chlorine formed and any residual HCl present. The ratio of hydrogen chloride to oxygen was held as close to 3..5 as possible during each run so that a slight excess of oxygen was present. Each run was one hour long. At the conclusion of each run, the total chlorine formed was determined by titrating the free iodine in the scrubber solution with sodium thiosulfate. The amount of unreacted hydrogen chloride was determined by titrating the scrubber solution with sodium hydroxide.

The results of the various runs are presented in Table I. As these results show, substantial yields were obtained even though conditions were not optimized and the experimental apparatus was quite simple. The results are even more impressive when it is considered that the reported HCl conversions represent up to eighty-four percent of the theoretical thermodynamic conversion.

The most economically significant use for the salt mixtures according to the present invention is in the regeneration of chlorine from hydrogen chloride. For this reason the foregoing discussion relates specifically to chlorine. It is to be understood, however, that the fused salt contactor and salt mixtures of the present invention can be used to oxidize hydrogen bromide and hydrogen iodide for the regeneration of bromine and iodine, respectively.

Referring to FIG. 2, the general process for regenerating any of the above mentioned halogens is shown. Metered amounts of an oxidizing gas and waste or by-product hydrogen halide are fed to a fused salt contactor 50 via lines 52 and 54, respectively. The contactor 50 contains a molten salt mixture at conditions previously described. When contacted with this mixture, the oxygen and halide react according to the following reaction:

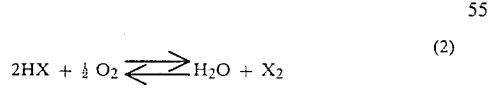

$$2HX + \tfrac{1}{2} O_2 \rightleftharpoons H_2O + X_2 \qquad (2)$$

X = Cl, Br or I

Thermodynamic considerations preclude reaction (2) from proceeding to completion; and the thermodynamic equilibrium is dependent on the reaction temperature. For this reason the effluent gas mixture leaving the salt contactor 50 in a line 56 contains a mixture of steam, unreacted hydrogen halide gas, elemental halogen gas, and unreacted oxidizing gas. Because this mixture contains substantially no sulfur dioxide, the gases of the mixture can be separated easily by conventional gas separation apparatus 58.

While we have shown and described a preferred embodiment of our invention, it will be apparent to those skilled in the art that changes and modifications may be made without departing from our invention in its broader aspects.

TABLE I

| | | Conversion of HCl to Chlorine Using Air | | | | |
|---|---|---|---|---|---|---|
| Run No. | Reaction Temp (°C.) | Gas Flow (cc/min)$^a$ | HCl—$O_2$ Ratio | Estimated Residence Time (seconds) | Theoretical HCl Conversion (%)$^b$ | Experimental HCl Conversion (%)$^c$ | Yield (%)$^d$ |
| 1 | 375 | 14 | 3.6 | 5 | 77 | 65 | 84 |
| 2 | 375 | 66 | 3.5 | 1 | 77 | 62 | 81 |
| 3 | 450 | 20 | 3.2 | 3 | 51 | 33 | 65 |
| 4 | 450 | 66 | 3.5 | 0.9 | 51 | 24 | 47 |
| 5 | 450 | 130 | 3.5 | 0.48 | 51 | 34 | 67 |
| 6 | 525 | 14 | 3.6 | 5 | 42 | 26 | 62 |
| 7 | 525 | 66 | 3.5 | 0.8 | 42 | 28 | 67 |
| 8 | 525 | 130 | 3.5 | 0.45 | 42 | 29 | 69 |

$^a$Average gas flow of combined hydrogen chloride and air at standard temperature and pressure
$^b$Theoretical thermodynamic conversion
$^c$% HCl Conversion = (g $Cl_2$) (100)/(g $Cl_2$ + g residual HCl)
$^d$Experimental conversion divided by theoretical conversion

We claim:

1. A process for regenerating chlorine from hydrogen chloride comprising:
   in a fused salt contactor which contains only liquids and gases and which is maintained substantially free of sulfur oxide gases, contacting an oxidizing gas comprising molecular oxygen and hydrogen chloride containing substantially no sulfur impurities with a molten salt mixture comprising 5 to 25 wt. percent $K_2SO_4$ and 50 to 90 wt percent $K_2S_2O_7$ and 2 to 25 wt. percent dissolved $V_2O_5$ oxidizing catalyst; and
   maintaining said salt mixture at a temperature between 275° C. and 475° C., sufficient to oxidize a major portion of said hydrogen chloride, and insufficient to substantially change or alter the balance of the components so that substantially no additions of make up quantities of said components are required and regeneration of said salt mixture outside said reactor is not required, thereby producing a gaseous effluent which contains primarily steam and chlorine along with a smaller amount of unreacted hydrogen chloride and unreacted oxidizing gas and which is substantially free of sulfur oxide gases.

2. A process according to claim 1 wherein said salt mixture contains 10 to 15 wt. percent oxidizing catalyst.

3. A process for regenerating elemental chlorine from hydrogen chloride comprising:
   in a fused salt contactor which contains only liquids and gases and which is maintained substantially free of sulfur oxide gasses, contacting hydrogen chloride having substantially no sulfur impurities and oxygen, at a molar ratio of about 3:5:1, with a molten salt mixture at a temperature between 325° C. and 425° C. for 0.5 to 5.0 seconds to produce a gaseous effluent which includes steam and chlorine gas and is substantially free of sulfur oxide gasses;
   said salt mixture comprising, in weight percent, 10–20% $K_2SO_4$; 65–70% $K_2S_2O_7$; 10–15% $V_2O_5$; and up to 10% sulfate selected from the group consisting of $Li_2SO_4$; $Na_2SO_4$; $H_2SO_4$ and mixtures thereof.

* * * * *

UNITED STATES PATENT AND TRADEMARK OFFICE
CERTIFICATE OF CORRECTION

PATENT NO. : 4,537,835

DATED : August 27, 1985

INVENTOR(S) : Charles A. Rohrmann & Harold T. Fullam

It is certified that error appears in the above-identified patent and that said Letters Patent are hereby corrected as shown below:

Column 2, line 10, "different" should be --difficult--.

Column 7, line 5, "3..5" should be --3.5--.

Column 8, line 58, "3:5:1" should be --3.5:1--.

Signed and Sealed this

Eighteenth Day of February 1986

[SEAL]

Attest:

DONALD J. QUIGG

Attesting Officer

Commissioner of Patents and Trademarks